P. P. BILHORN.
FOLDING ORGAN.
APPLICATION FILED JULY 1, 1912.

1,152,475.

Patented Sept. 7, 1915.
4 SHEETS—SHEET 1.

Witnesses
O. M. Wennich
A. S. Dennison

Inventor
Peter P. Bilhorn
by A. Miller Belfield
Atty

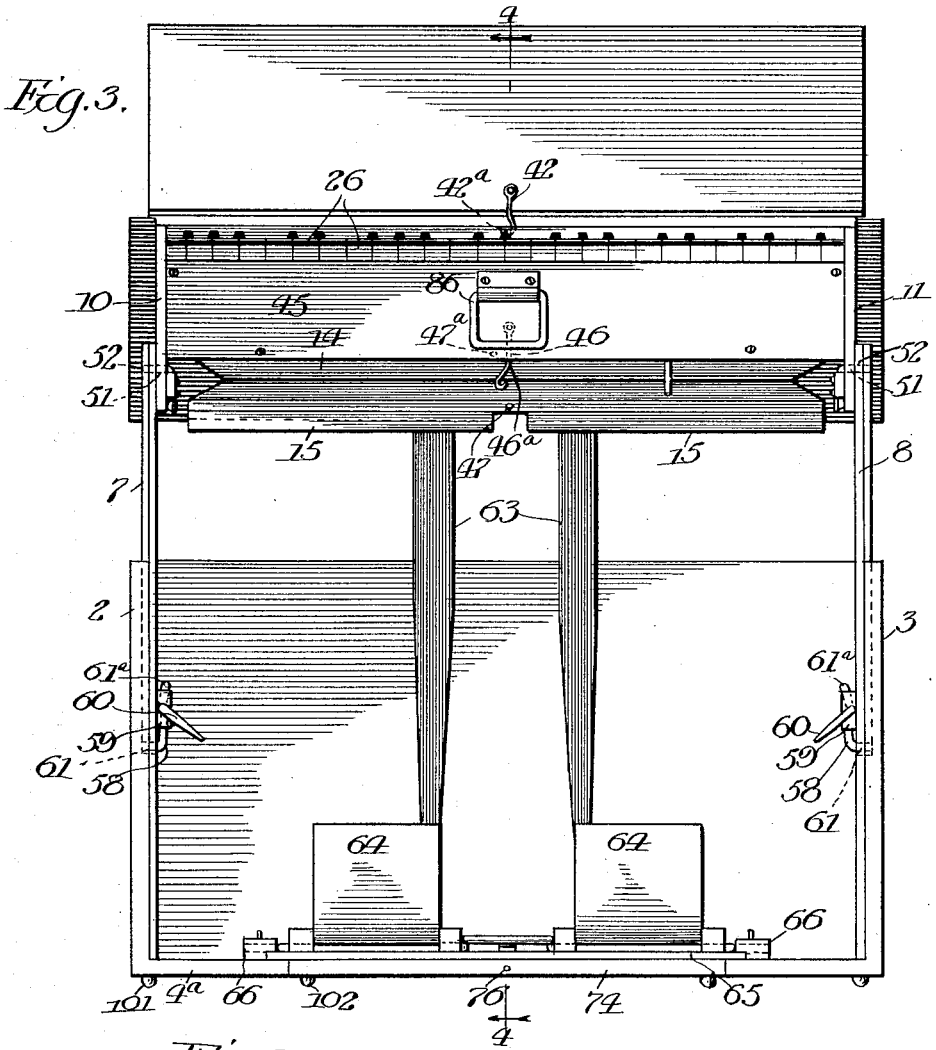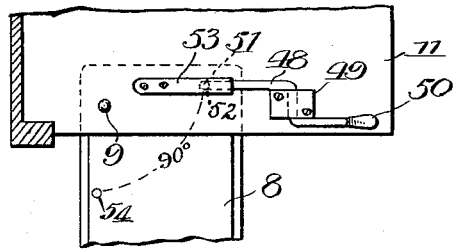

P. P. BILHORN.
FOLDING ORGAN.
APPLICATION FILED JULY 1, 1912.

1,152,475.

Patented Sept. 7, 1915.
4 SHEETS—SHEET 3.

Witnesses

Inventor
Peter P. Bilhorn
by A. Miller Belfield Atty.

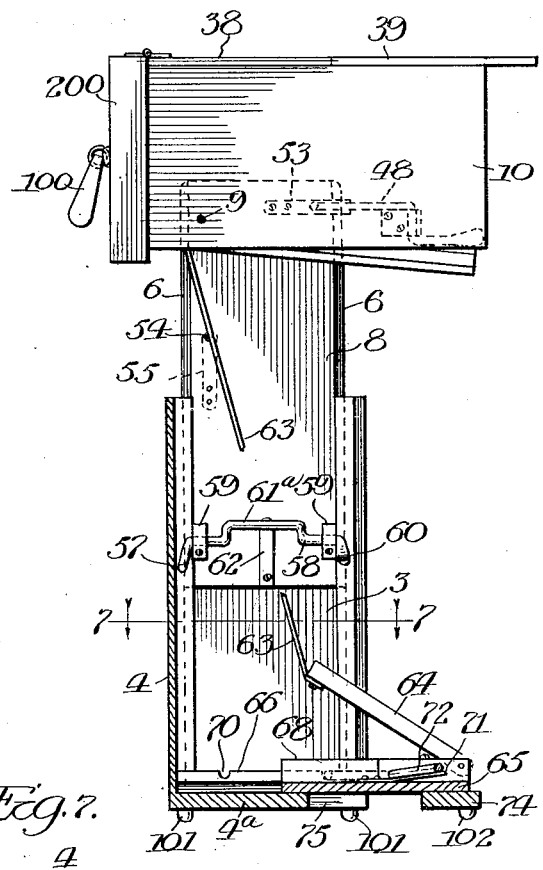
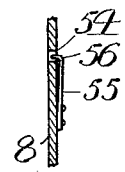
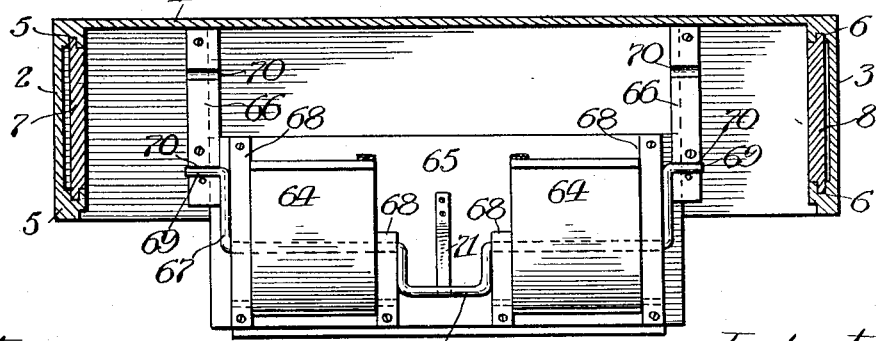

UNITED STATES PATENT OFFICE.

PETER P. BILHORN, OF CHICAGO, ILLINOIS.

FOLDING ORGAN.

1,152,475. Specification of Letters Patent. Patented Sept. 7, 1915.

Application filed July 1, 1912. Serial No. 706,881.

*To all whom it may concern:*

Be it known that I, PETER P. BILHORN, a citizen of the United States, residing at Chicago, in the county of Cook and State of Illinois, have invented a certain new and useful Improvement in Folding Organs, of which the following is a full, clear, concise, and exact description, reference being had to the accompanying drawings, forming a part of this specification.

My invention relates to an improvement in folding organs, and has as its principal object the provision of a portable organ which shall be smaller more compact and lighter than those formerly in use.

A second object of my invention is to improve the sound producing mechanism of small reed organs whereby it may be more compact and efficient.

A further object of my invention resides in the particular arrangement and combination of parts hereinafter described.

Figure 1:
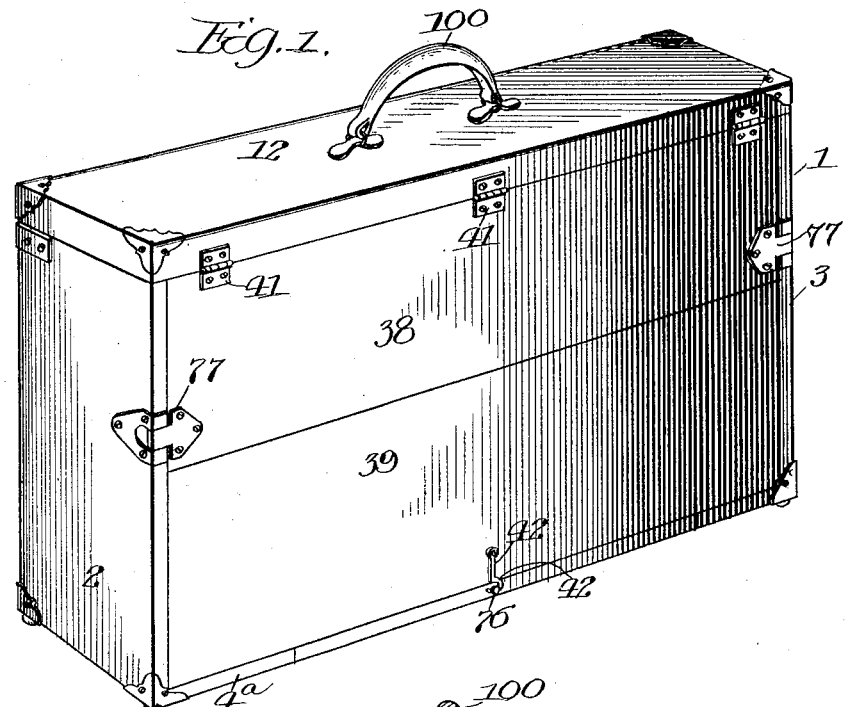
Figure 2:
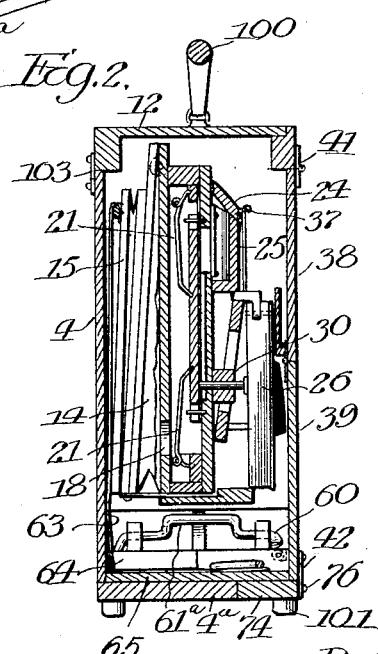
Figure 4:
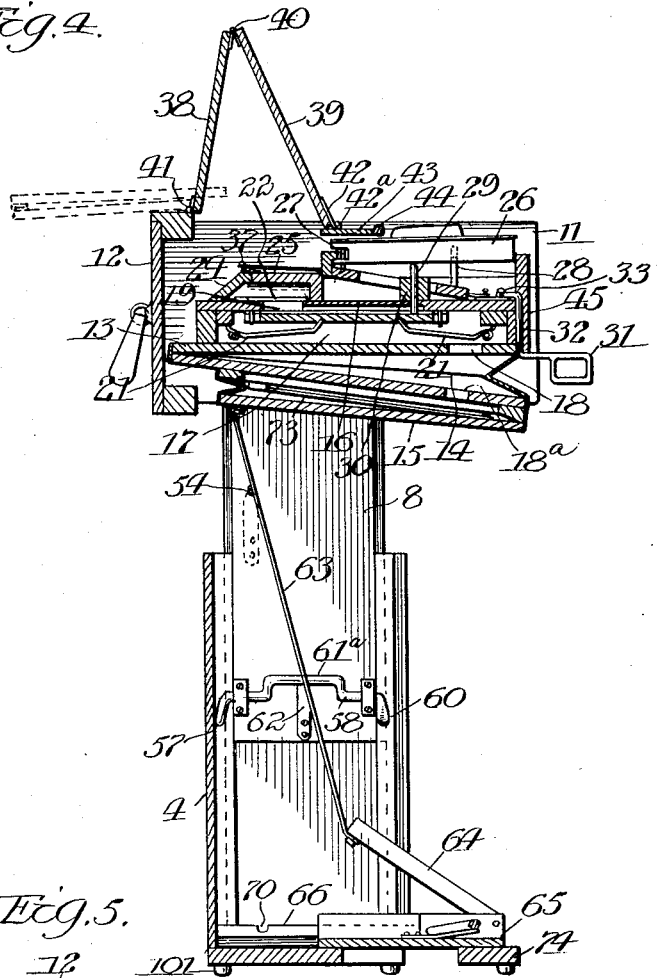
Figure 5:
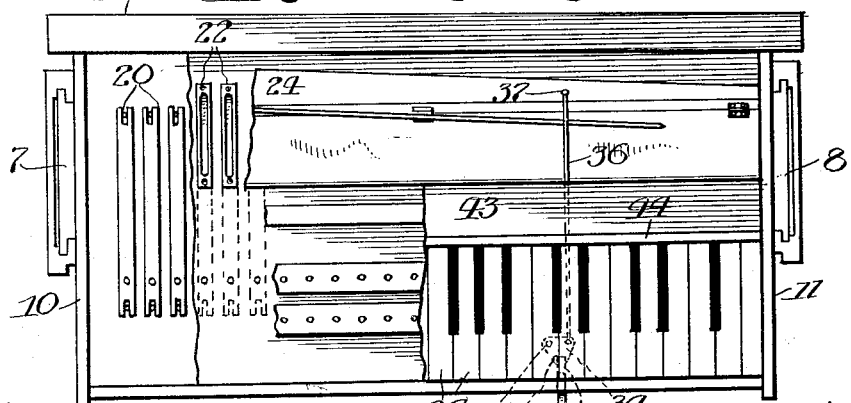

In the accompanying drawings Figure 1 is a perspective view of my improved organ in its folded or collapsed position; Fig. 2 is a central vertical cross section of the device shown in Fig. 1; Fig. 3 is a front elevation of my device in its unfolded or expanded condition; Fig. 4 is a vertical cross section on the line 4—4 of Fig. 3; Fig. 5 is a top plan view of Fig. 4, parts being broken away; Fig. 6 is a side elevation of Fig. 3 partly in section; Fig. 7 is a horizontal cross section on the line 7—7 of Fig. 6; Fig. 8 is a detail view showing one of my improved latching devices; and Fig. 9 is a detail view showing means for unlatching certain parts when the device is partly collapsed.

Referring more particularly to the drawings, 1 represents my improved organ in its entirety. The organ 1 is furnished with a rigid supporting frame or base best illustrated in Figs. 1 and 7. The supporting frame or base comprises two vertical end pieces 2 and 3, a vertical back piece 4, and the horizontal bottom 4ᵃ, parts 4 and 4ᵃ connecting parts 2 and 3. The case thus formed is what may be termed a "suit case" type of structure, that is, a case similar to a species of traveling hand satchel now employed having flat sides and ends and a flat top and bottom, as well shown in Fig. 1 of the drawings. The pieces 2 and 3 are recessed to receive flanges 5—5, and 6—6 on the sliding parts 7—8 respectively. Parts 7 and 8 are provided at their upper ends with symmetrically placed pivots 9—9, from which is swung a structure 200 supporting the key bed, bellows and reeds of the organ. This swinging structure comprises two side boards 10 and 11, between which is a board 12 serving as a top for the entire case when the device is collapsed, but which swings back into a rear vertical position when the device is set for playing, as shown in Fig. 4. Extending between the boards 10 and 11 is also a board 13, from which is supported a reservoir bellows 14, below which are feeders or pumping bellows 15—15. Above the board 13 is sounding board 16, spaced therefrom by suitable strips forming an interior suction chest 17 communicating with the storage bellows 14 by means of the port 18. The board 16 is provided with a series of elongated ports such as 19 which are normally covered by valves 20. Valves 20 are normally pressed upward against the under face of the board 16 by means of springs 21—21. Extending across the mouth of the ports 19 above the board 16 are a set of reeds such as 22. The reeds 22 are inclosed in a chamber 23 which has a movable swell piece 24 hinged at its upper end to the board or plate 25 forming the cover to the chamber 23. The keys for controlling the instrument are shown in the usual form at 26 in Figs. 3, 4, and 5. These keys are pivoted at their rear ends as shown at 27, and are provided with guide pins 28. Rods 29 running through the guide strip 30 contact with the under side of the keys to push down on the valves 20 when it is desired to sound the notes.

31 is a lever designed to be moved by the player's knee which is pivoted at the point 32. The inner end of the lever 31 is designed to push against a pin 33 on the pivoted plate 34 which has its pivot at the point 35.

36 is a rod connecting the plate 34 with a pin 37 on the swell board 24. Consequently when the player pushes the outer end of the lever 31 to the right, as shown in Fig. 5, the board 24 is lifted to allow a larger volume of sound to flow out from the chest 23. The swinging structure is provided also with boards or plates 38—39 which form the front of the case when the device is collapsed, as shown in Fig. 1 but which fold up to form a music rack as shown in Fig. 4, when the device is to be played, or cover as in Fig. 6. Plates 38 and 39 lie back as in Fig. 4 in dotted lines to allow all sound to escape. This also allows ready access to the reeds for tuning or repairs. The plates 38 and 39 are hinged together, as shown at 40, while the plate 38 is hinged to the frame of the swinging structure, as shown at 41. The plate 39 is provided with a hook 42 which serves to fasten the plate 39 to the base of the device when it is collapsed, but which may be fastened to an eye 42$^a$ on a cross bar 43 when the device is in the playing position. In front of the bar 43 is a strip 44 for engaging the edge of the music sheet. At the side of the swinging structure opposite the plate or board 12 is a board 45 which is vertical as shown in Fig. 4 when the device is in the playing position. On the face of the board 45 is carried a handle 86 for use in collapsing and unfolding the device. Attached to the inner face of the board 45 or to the front of the suction chest 17 is a hook or latch 46 which is designed to engage the pin 47 on the movable part of the storage bellows 14, so as to hold the bellows in collapsed position when the device is to be folded. The latch 46 is of special design as shown, having a shoulder 46$^a$ and having a short hook. Consequently when the first pump on the feeders collapses the bellows 14, the pin 47 strikes against the shoulder 46$^a$ and automatically unhooks the latch 46.

The pin or nail 47$^a$ on the side of the suction chest 17 prevents the latch 46 from being pushed into an inaccessible position. The latch 46 is easily thrown so as to engage the pin 47 by pumping once on the feeders and then pushing the latch over against the pin. As best shown in Fig. 8 the boards 10 and 11 of the swinging structure are provided with latches 48—48 which are fastened on the inside of the boards 10 and 11 by means of pivot plates 49. The latches 48 have an operating handle 50 at one end, and at the other end are bent inwardly as shown in Fig. 3 at 51—51, so as to engage holes 52—52 in the boards 7 and 8. A spring piece 53 bears against the inner end of the latch so as to hold the part 51 securely in the aperture 52. As shown in the drawings these latches hold the swinging structure in the playing position, but the latches may be released and the swinging structure turned through 90 degrees by pressing on the parts 50 so as to withdraw the ends 51 from the apertures 52. When the swinging structure is thus turned in a position for collapsing the device, one of the parts 51 of the latch 48 swings down so as to engage an aperture 54 in the board 8. As best shown in Fig. 8, the apertures 52 and 54 are placed 90 degrees apart in the board 8 on an arc struck from the pivot. As the position of the aperture 54 is difficult to reach when the device is in this position, I provide a device as shown in Fig. 9 for releasing the latch 48 when it is desired to unfold the organ. This unlatching device is fastened on the exterior of the board 8 and consists of a spring member 55 attached at one end to the board such as 8, and having its free end bent at right angles as shown at 56 to extend through the opening 54 in the board, such as 8. As shown in Fig. 7 there is a sufficient distance between the boards 3 and 8 to prevent the spring 55 from being pushed inwardly when the organ is collapsed. When the device is collapsed the handle 50 and the device 55 are both entirely out of reach, so that it is impossible to swing the playing parts outwardly until the slides 7 and 8 have been extended. This is important because otherwise the back 4 might be broken by opening the swinging structure while in its lower position. Moreover, if the playing parts were swung before being lifted, the handle 100 would become useless for raising the playing parts. At the lower end of the sliding boards 7 and 8 are two latches 58—58 which are pivoted in two blocks 59—59, each of which has an arm 60 at one end and is bent inwardly at its other end, as shown at 61, so as to project through an aperture 57 in the boards 2 and 3, so that the boards 7 and 8 may be held in extended position. Intermediate the blocks 59—59 each latch 58 is bent into a crank form, as shown at 61$^a$ in Fig. 6, and a spring 62 is provided which is attached at one end to the sliding board such as 7 or 8 and acts against the crank part 61$^a$ at its other end to throw the crank part out from the moving board and consequently throw the bent end 61 into the aperture which it is designed to occupy.

The pumping bellows 15 are operated by cords 63—63 which are operated by pedals 64—64. The pedals 64 are carried by a sliding board 65 which engages grooves in the guide strips 66—66. When the organ is collapsed the board 65 is pushed back into the position shown in Fig. 2, but when the organ is arranged for playing the board 65 is pulled forward as shown in Fig. 4. The board 65 carries a latch 67 which is made in the form of an integral rod pivoted to the upper face of the board in blocks 68—68. The two ends of the latch rod are bent as shown at 69—69, in a direction at right angles to the movement of the board and the parts 69 are designed to engage slots or grooves 70 in the upper faces of the guide strips 66. As shown in Fig. 7 two sets of grooves 70 are provided, one for holding the board 65 in collapsed position, and the other for holding it in the playing position. A spring 71 acts on a crank part 72 of the latch 67 tending to throw the crank part upwardly and to force the ends 69 downwardly into the grooves 70. The pedals 64 are also pivoted in the blocks or strips 68 and connect at their inner edges with the cords or bands 63 which run to the movable members of the pumping bellows. The pumping bellows are provided with springs 73 which normally hold them in a collapsed position, so that they may be expanded by pushing on the pedals. On the bottom of the board 65 is an extensible strip or block 74 which is designed to fit into the recess 75 in the bottom board 4ᵃ when the organ is collapsed. The block or strip 74 carries a pin 76 which is engaged by the hook 42 when the organ is collapsed.

As shown in the drawings, the hinged boards 38 and 39 may occupy four different positions. First the position shown in Figs. 1 and 2 in which they act as the front side of the case when the organ is collapsed; second it serves as a cover for the playing parts when the organ has been expanded, but when it is not being used for playing and it is desired to leave the parts covered; the second position is shown in Fig. 6. The third position is shown in Fig. 4 in which the boards are partly folded and serve as a music rack. The fourth position is shown in dotted lines also in Fig. 4 and in this position the boards are completely folded, and laid back so as to leave the playing parts completely exposed for inspection or repairs. In the fourth position also the volume of sound given by the organ is increased. As best shown in Fig. 6, the base of the organ is provided with a plurality of supports 101—101. One or more supports 102 also are carried on the block or strip 74. Consequently when the sliding board 65 which carries the strip 74 is extended or pulled out, as shown in Fig. 6, the organ is provided with a broader and firmer base than when the board 65 is in the collapsed position as shown in Fig. 2. The sliding board 65 gives a further advantage in addition to that just mentioned in providing a support for the pedals 64 since it enables me to make the frame or case of the organ narrower than I otherwise could do. It would be impossible to operate the pedals in a case as narrow as the one shown, unless they could be pulled forward because there would not be sufficient room for a person's feet in performing the ordinary pumping operation.

Starting with the organ in a collapsed position as shown in Figs. 1 and 2, the organ is expanded for use as follows: The hooks 42 and 103 are first loosened, and the operator seizes the handle 100 which serves both for carrying the organ when collapsed and for the opening operation. The swinging structure and slides are then pulled up by the handle until the latches 61 catch automatically in the holes 57. The sliding boards being extended the releasing device 55 is made accessible. The hinged boards 38 and 39 having been partly folded, the operator then takes hold of the handle 86 by one hand and with the other hand releases the latch 48 by means of the device 55 whereupon the swinging structure 200 may be swung up into the horizontal position by means of the handle 86. Next the board 65 is pulled out, giving the organ a firm base, and placing the pedals in position for use. The hinged boards 38 and 39 are then hooked up in position shown in Fig. 4 to serve as a music rack. It is obvious, however, that these boards may be hooked up in this position just preceding the time when the operator uses the handle 86 to swing the structure 200 into the horizontal position, since these boards must be lifted somewhat at that time to enable the operator to take hold of the handle. In collapsing the organ, the board 65 is first pushed inwardly, the boards 38 and 39 laid down into the position shown in Fig. 6, and the swinging structure 200 is released by pressing on the latches 48 and is swung down into the vertical position by means of the handles 86. In lowering the sliding boards it is necessary to lift on the handle 60 in order to release the latches 58. Consequently the sliding boards 8 are lowered by the handles 60 instead of by the handle 100 used in raising them.

As shown in Fig. 1, the part 38 is designed to be latched to the parts 2 and 3 by means of latches 77—77 preferably of the form shown in my Patent No. 944,713, issued Dec. 28, 1909, although any suitable form of latch may be used. These latches serve to hold the part 38 securely in place when the device is collapsed and prevent any tendency of the parts 38 and 39 to bulge outwardly when the organ is in collapsed position.

It will be seen that I have devised a collapsible organ which embodies all the necessary playing parts. The resulting structure, however, is so small that it cannot be distinguished from an ordinary suit case except on close inspection. This is a marked advantage over previous collapsible organs which have been so bulky as to resemble sample cases.

It will be understood by those skilled in the art, that while I have shown and described the preferred form of my invention, that I do not limit myself to the precise arrangement shown and described herein, but that various rearrangements and modifications thereof may be made without departing from the spirit of my invention.

Having thus described my invention, what I claim is:

1. A folding organ comprising a case provided with vertically arranged ends, a pair of slides having sliding connections with said ends of the case, a boxlike structure containing organ mechanism arranged between said slides and pivotally connected with the upper ends of the same, the pivotal connection being adapted to permit said boxlike structure to fit between said slides with its front and back flush with the front and back of the slides when swung about its pivotal connection, whereby said slides with the boxlike structure between them can be lowered into the case, said slides being substantially the height of the end walls of the case whereby said structure may fit closely within the case and substantially fill the same.

2. A folding organ comprising a case having its opposite ends provided with vertical grooves, a pair of slides arranged to fit and work in said grooves, a boxlike structure containing organ mechanism arranged between said slides and pivoted to the upper rear portions of the same, said slides being substantially the height of the ends of the case, and said boxlike structure being substantially the size of the interior of the case, whereby the slides and structure may be lowered into the case and substantially fill the same, and locking devices for locking the slides in vertical adjustment, said locking devices being also adapted to serve as handles for lifting and lowering said slides and structure.

3. A device of the class specified, comprising in combination a case of suit case shape, organ mechanism adapted for arrangement within said case and for removal therefrom, and sliding mechanism carrying said organ mechanism and arranged for vertical sliding movement longitudinally of the ends of said case, when the same is resting upon one of its long narrow sides.

4. A folding organ comprising a base having vertically disposed ends, vertical supports having sliding connection with said ends, and a boxlike structure comprising organ mechanism pivotally mounted at the upper ends of said supports.

5. A folding organ comprising a base having vertically disposed ends, vertical supports having sliding connection with said ends, a boxlike structure comprising organ mechanism pivotally mounted at the upper ends of said supports, and latches whereby said boxlike structure may be temporarily locked in different angular adjustments.

6. A folding organ comprising a base having vertical end pieces, supports having sliding connection with said end pieces, and a boxlike structure comprising organ mechanism carried by and having an adjustable connection with said supports, said adjustable connection being adapted to permit said boxlike structure to be swung so as to place the organ keys in proper position for playing when said supports are elevated.

7. A folding organ comprising a base having vertical ends, supports having sliding connection with said ends, and a boxlike structure comprising organ mechanism, said structure being substantially the size and shape of said base whereby when lowered to said base, said structure corresponds substantially in size with the base to permit insertion of said structure into said base, said structure having a connection with said supports adapted to permit it to be adjusted relatively to said supports to place the keys in proper playing position when said supports are elevated.

8. In a device of the class specified, a case of suit case shape having its narrow vertical walls provided with guideways, in combination with slides arranged for vertical sliding movement in said guideways, and a keyboard playing mechanism pivotally mounted upon said slides and adapted for insertion into and withdrawal from said case.

9. A device of the class specified comprising a case of suit case shape, having its relatively narrow walls provided with vertical guideways, slides arranged to slide in said guide ways, a boxlike structure containing playing mechanism pivotally mounted upon the upper ends of said slides, said boxlike structure being adapted to fit into said case, and a handle mounted upon the top of said boxlike structure for lifting the same.

10. A folding organ comprising a case, vertically adjustable supports mounted for sliding movement relatively to the ends of said case, and a box-like structure provided with keys and coöperating organ mechanism pivotally connected with the upper portions of said supports.

11. A folding organ comprising a case, vertically adjustable supports mounted for sliding movement relatively to the ends of said case, a box-like structure adapted to fit in said case, said box-like structure being provided with keys and coöperating organ mechanism and being pivotally connected to said supports whereby when the latter are elevated said structure may be swung to bring said keys into horizontal position for playing.

12. A folding organ comprising a case, vertically adjustable supports mounted for sliding movement relatively to the ends of said case, a box-like structure adapted to fit in said case, said box-like structure being provided with keys and coöperating organ mechanism and being pivotally connected to said supports whereby when the latter are elevated said structure may be swung to bring said keys into horizontal position for playing, and locking devices for temporarily locking said box-like structure to said supports with said structure in horizontal position.

13. A folding organ comprising a case, vertically adjustable supports mounted for sliding movement relatively to the ends of said case, a box-like structure adapted to fit in said case, said box-like structure being provided with keys and coöperating organ mechanism and being pivotally connected to said supports whereby when the latter are elevated said structure may be swung to bring said keys into horizontal position for playing, locking devices for temporarily locking said box-like structure to said supports with said structure in horizontal position, and means for temporarily locking said supports in elevated position.

14. In a device of the class specified, a case of suit case shape having its narrow vertical walls provided with guideways, in combination with slides arranged for vertical sliding movement in said guideways, and a keyboard playing mechanism pivotally mounted upon said slides and adapted for insertion into and withdrawal from said case, and devices carried by said slides for lifting the same, said devices being provided with locking means for locking said slides in vertical adjustment.

15. The combination of a case having vertical end walls, organ mechanism adapted for arrangement within said case and for removal therefrom, and sliding mechanism carrying said organ mechanism and arranged for vertical sliding movement relatively to said vertical end walls.

16. A device of the class specified, comprising a case of suit case shape, playing mechanism therein, and an extension made slidable in and out of the bottom of said case when the same is standing in usual suit case position, said extension being adapted to rest upon the floor when extended and being provided with means for holding it in rigid position when extended, whereby said extension forms a rigid supporting structure to widen the base of the device.

17. The combination of a base and sliding supports carrying keyboard playing mechanism, of means for locking said supports in adjusted position comprising apertures in the base, and one or more locking bars mounted upon the sliding supports and having ends adapted to fit into said apertures in the base, and thereby lock said sliding supports in adjustment.

18. The combination with supporting members of a structure comprising keyboard playing mechanism pivotally mounted upon said supporting members, a locking device mounted on one of said supporting members comprising a pin adapted to fit into an aperture in said supporting members, and a spring controlled bar for holding said pin in position, and a clip mounted on the other side of said supporting member having a pin adapted to enter the aperture in said member from the other side and thereby force out said locking pin.

19. The combination with the keyboard playing mechanism and supporting members therefor, and with a base with reference to which said supporting members are adjustable, of a locking device for locking said supporting members to said base, said locking device comprising a bar pivotally mounted on one of said supporting members and having a bent end adapted to enter an aperture in said base, said bar also having a bent portion forming a handle, said handle being arranged so that when elevated it will turn said bar to withdraw said pin from said aperture, whereby said handle may be used both to unlock supporting members and base and to elevate the former.

20. The combination with a keyboard playing mechanism and supporting members therefor, and with a base with reference to which said supporting members are vertically adjustable, of a locking and lifting device comprising a horizontally arranged locking bar pivotally mounted at separated points on one of said supporting members, said bar having its portion between said points of pivotal support bent to form a crank handle and having its ends bent laterally to form pins adapted to enter apertures formed in said base, whereby said handle may be operated to withdraw said pins from said base and also to elevate said supporting members.

21. The combination with a base having side uprights provided with slideways, of slides adapted to slide in said slideways, a structure involving a keyboard and playing mechanism operated thereby mounted for angular adjustment upon said slides, means for locking said structure in such adjustment when the sides are elevated, and means for unlatching said locking means.

22. The combination with a base having side uprights provided with slideways, of slides adapted to slide in said slideways, a structure involving a keyboard and playing mechanism operated thereby mounted for angular adjustment upon said slides, means for locking said structure in such adjustment when the slides are elevated, and means for unlatching said locking means, said unlatching means being covered by said base when the slides are in a lowered position.

23. The combination of a base having upright walls provided with slideways, slides arranged to slide in said slideways, a structure involving a keyboard and playing mechanism operated thereby mounted for angular adjustment upon said slides, means for locking said structure in angular adjustment when the slides are elevated, comprising a pivoted lever mounted on said structure and adapted to enter an aperture in said slides, and means for unlatching said locking device comprising a clip mounted on the outer side of one of said slides and provided with a pin adapted to enter said aperture in said slide and push the pin of said lever therefrom.

24. The combination of a base having upright walls provided with slideways, slides arranged to slide in said slideways, a structure involving a keyboard and playing mechanism operated thereby mounted for angular adjustment upon said slides, means for locking said structure in angular adjustment when the slides are elevated, comprising a pivoted lever mounted on said structure and adapted to enter an aperture in said slides, and means for unlatching said locking device comprising a clip mounted on the outer side of one of said slides and provided with a pin adapted to enter said aperture in said slide and push the pin of said lever therefrom, said clip being mounted upon said slide in such position that when said slide is in its lowermost position, it is on the inner side of the corresponding wall of said base and is thereby concealed and made inaccessible.

25. A folding organ comprising a case of suit case character having its end walls provided with vertically arranged guideways, slides arranged for vertical movement within said guideways, there being a small space between the outer sides of said slides and the inner sides of said slideways, a structure involving a keyboard and playing mechanism operated thereby mounted for angular adjustment upon the upper ends of said slides, means for locking said slides in vertical adjustment, comprising crank shaped rods or bars mounted upon the inner sides of the slides, and having their ends bent and adapted to fit into apertures in the ends of said case, means for locking said structure in angular adjustment comprising a lever pivoted to said structure and having a bent end adapted to enter an aperture in one of said slides, and means for unlatching said last mentioned locking device comprising a clip mounted upon the outer side of said slide and having a pin adapted to enter the aperture entered by said bent lever end, and push said end from said aperture, said clip being adapted to fit into the space between said slide and the side wall of said case when said slides are in lowered positions.

26. The combination of a bellows having its swinging member provided with a pin, a hook adapted to engage said pin, and pivotally mounted in position to hold said swinging bellows in nearly closed position, said hook having a slanting shoulder which lies in the path of the pin when said pin is engaged by said hook, whereby when the bellows is held in substantially collapsed condition by said pin and hook, further collapse of the bellows will automatically disengage the pin and hook by causing the former to strike said slanting shoulder.

27. A musical instrument case containing keys and playing mechanism operated by said keys, the portion of said case covering said keys and an adjacent portion of said case being made of two parts hinged together, and the rear one of said parts being hinged to the portion of the case adjacent to it, whereby said hinged parts may be doubled back to uncover the keys and also form an elevated structure for supporting music.

In witness whereof, I hereunto subscribe my name this 27th day of June A. D., 1912.

PETER P. BILHORN.

Witnesses:
A. S. DENNISON,
A. L. JONES.